United States Patent
Ashok et al.

(10) Patent No.: US 9,471,360 B2
(45) Date of Patent: Oct. 18, 2016

(54) RETURNING TERMINATED VIRTUAL MACHINES TO A POOL OF AVAILABLE VIRTUAL MACHINES TO BE REUSED THEREBY OPTIMIZING CLOUD RESOURCE USAGE AND WORKLOAD DEPLOYMENT TIME

(71) Applicant: International Business Machines Corporation, Armonk, NY (US)

(72) Inventors: Rohith K. Ashok, Natick, MA (US); James K. Kochuba, Raleigh, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 14/211,169

(22) Filed: Mar. 14, 2014

(65) Prior Publication Data

US 2015/0261557 A1  Sep. 17, 2015

(51) Int. Cl.
*G06F 9/455* (2006.01)
*H04L 12/911* (2013.01)

(52) U.S. Cl.
CPC .......... *G06F 9/45558* (2013.01); *H04L 47/70* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| 6,694,346 | B1 | 2/2004 | Aman et al. |
| 6,823,509 | B2 | 11/2004 | Webb |
| 7,263,700 | B1 | 8/2007 | Bacon et al. |
| 8,307,362 | B1* | 11/2012 | Gong .................... G06F 9/5077 718/1 |
| 2007/0288224 | A1 | 12/2007 | Sundarrajan et al. |
| 2011/0179415 | A1* | 7/2011 | Donnellan .......... G06F 9/45558 718/1 |
| 2012/0191908 | A1* | 7/2012 | North .................. G06F 11/2097 711/112 |
| 2013/0007744 | A1 | 1/2013 | Arasaratnam |
| 2013/0074065 | A1* | 3/2013 | McNeeney ........... G06F 11/141 718/1 |
| 2013/0275969 | A1* | 10/2013 | Dimitrov .................. G06F 8/61 718/1 |
| 2015/0347430 | A1 | 12/2015 | Ghosh et al. |

FOREIGN PATENT DOCUMENTS

EP  1693754 A2  8/2006

OTHER PUBLICATIONS

Mell et al., "The NIST Definition of Cloud Computing," Special Publication 800-145, Sep. 2011. Office Action for U.S. Appl. No. 14/604,520 dated Jul. 1, 2016, pp. 1-12.

* cited by examiner

*Primary Examiner* — Kenneth Tang
(74) *Attorney, Agent, or Firm* — Robert A. Voigt, Jr.; Winstead, P.C.

(57) ABSTRACT

A method, system and computer program product for optimizing cloud resources in utilizing a pool of virtual machines to service user workloads. A writeable partition is created to store middleware and user activity associated with a virtual machine obtained from a pool of available virtual machines to be deployed. In response to the obtained virtual machine being terminated, the contents of the created writeable partition are erased so that the data generated by the middleware and user activity will not be available for subsequent users. The virtual machine is later returned to the pool of available virtual machines after resetting its password and network address to a default state. In this manner, fewer cloud resources are used since resource intensive activities that were required in provisioning a new virtual machine can be eliminated since previously terminated virtual machines can be utilized in the pool of available virtual machines.

14 Claims, 5 Drawing Sheets

RETURNING TERMINATED VIRTUAL MACHINES TO A POOL OF AVAILABLE VIRTUAL MACHINES TO BE REUSED THEREBY OPTIMIZING CLOUD RESOURCE USAGE AND WORKLOAD DEPLOYMENT TIME

TECHNICAL FIELD

The present invention relates generally to cloud computing, and more particularly to returning terminated virtual machines to a pool of available virtual machines to be reused thereby optimizing cloud resource usage and workload deployment time.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of the physical resources of the computer. A guest operating system runs on each guest, and the guest appears to the guest operating system as a real computer. Each guest operating system may host one or more virtual machines.

Currently, when a new virtual machine is required to be utilized by the user (i.e., a new virtual machine is required to service the user's workload), various tasks need to be performed utilizing cloud resources. For example, when a new virtual machine is deployed to service the user's workload, a new virtual disk is allocated on a storage device, an operating system is loaded into memory and initialized and various first-boot activities are performed, such as setting a hostname, network address, etc.

One method for reducing the burden of virtual machine provisioning at deployment time is to create a pool of pre-deployed virtual machines which may be used when a user requests an instance of a virtual machine. However, the pool of pre-deployed virtual machines is populated with only newly provisioned virtual machines. As discussed above, newly provisioned virtual machines require a significant amount of cloud resources to be utilized. Hence, such a method only shifts the burden of virtual machine provisioning prior to deployment time. That is, such a method only reduces the amount of cloud resources being utilized at the virtual machine deployment time but does not reduce the overall amount of cloud resources being utilized since these cloud resources are being utilized prior to the virtual machine deployment time.

If, however, the pool of available virtual machines to be deployed could be populated with previously terminated virtual machines as opposed to only newly provisioned virtual machines, then an overall reduction in the cloud resources being utilized could be achieved.

Unfortunately, there is not currently a means for populating the pool of available virtual machines to be deployed with previously terminated virtual machines as opposed to only newly provisioned virtual machines.

BRIEF SUMMARY

In one embodiment of the present invention, a method for optimizing cloud resources in utilizing a pool of virtual machines to service user workloads comprises receiving a request from a user's workload for an instance of a virtual machine. The method further comprises obtaining the instance of the virtual machine from a pool of virtual machines. The method additionally comprises creating, by a processor, a writeable partition to store middleware and user activity to be associated with the obtained instance of the virtual machine. Furthermore, the method comprises mounting the created writable partition in a storage unit. Additionally, the method comprises unmounting the created writable partition from the storage unit in response to the instance of the virtual machine being terminated. In addition, the method comprises erasing contents of the created writable partition in response to the instance of the virtual machine being terminated. Furthermore, the method comprises returning the instance of the virtual machine to the pool of virtual machines in response to the instance of the virtual machine being terminated.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
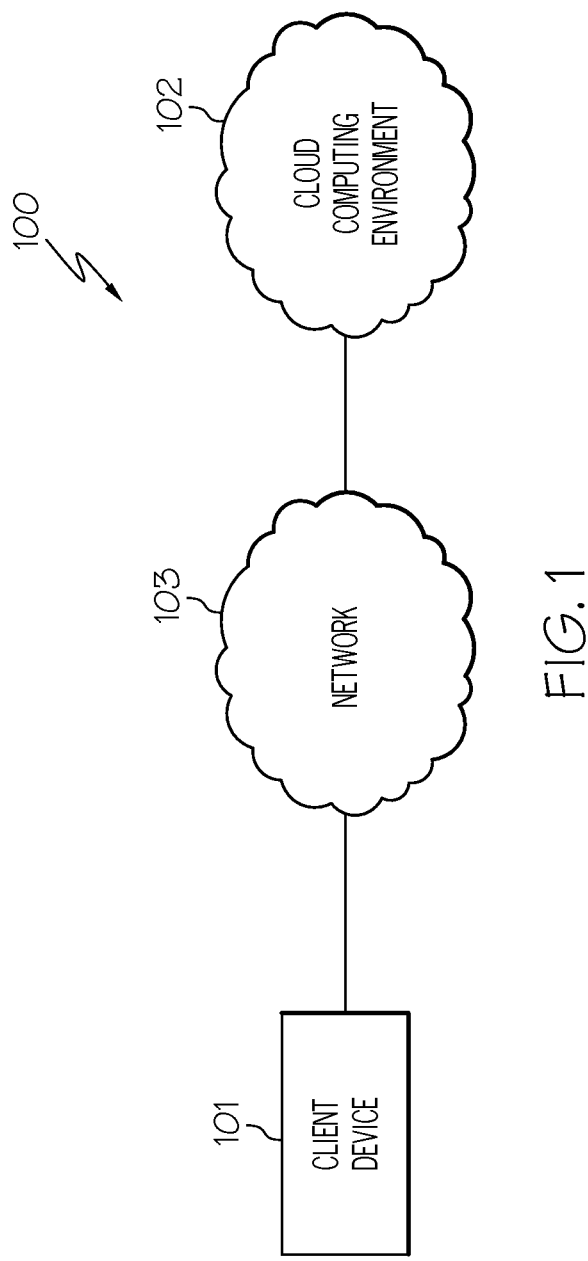
FIG. 1 illustrates a network system configured in accordance with an embodiment of the present invention.

The present invention comprises a method, system and computer program product for optimizing cloud resources in utilizing a pool of virtual machines to service user workloads. In one embodiment of the present invention, an instance of a virtual machine is obtained from a pool of available virtual machines to be deployed in response to receiving a request from the user's workload for an instance of a virtual machine to service the user's workload. A writeable partition is created to store the middleware and user activity associated with the obtained virtual machine. "Middleware activity" refers to the data generated by the obtained virtual machine in connection with the services provided to the virtual machine by the middleware applications. Furthermore, "user activity" refers to the data generated by the obtained virtual machine in connection with servicing the user's workload. The created writable partition is mounted within a storage unit. Furthermore, a partition is created to store the virtual machine operating system ("guest operating system") (operating system for the obtained virtual machine) and its supporting files. The created partition is mounted within a RAM drive of a cloud computing node. Changes made to the RAM drive by the user's workload are tracked. For example, the user's workload may make changes to parts of the guest operating system based on the user's authentication credentials. In response to the virtual machine being terminated, the created writeable partition is unmounted and the contents of the created writeable partition are erased so that the data, including sensitive data, generated by the middleware and user activity will not be available for subsequent users. Furthermore, in response to the virtual machine being terminated, the created partition in the RAM drive is unmounted and the tracked changes in the RAM drive are rolled back. These tracked changes are rolled back for security purposes so that no changes to the system (e.g., changes to parts of the guest operating system) under the current user are persisted for a subsequent user. The password and network address of the virtual machine are then reset to its default state to prepare the virtual machine to be reused. The virtual machine is then returned to the pool of available virtual machines for deployment. In this manner, the pool of available virtual machines for deployment does not have to be populated only with newly provisioned virtual machines. As a result, fewer cloud resources are used since resource intensive activities, such as allocating a new virtual disk, loading the operating system into memory, initializing the operating system, etc. that were required in provisioning a new virtual machine can be eliminated. Furthermore, the workload deployment time is improved since the cloud resources can be utilized for deploying the user's workload as opposed to being utilized for provisioning new virtual machines.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
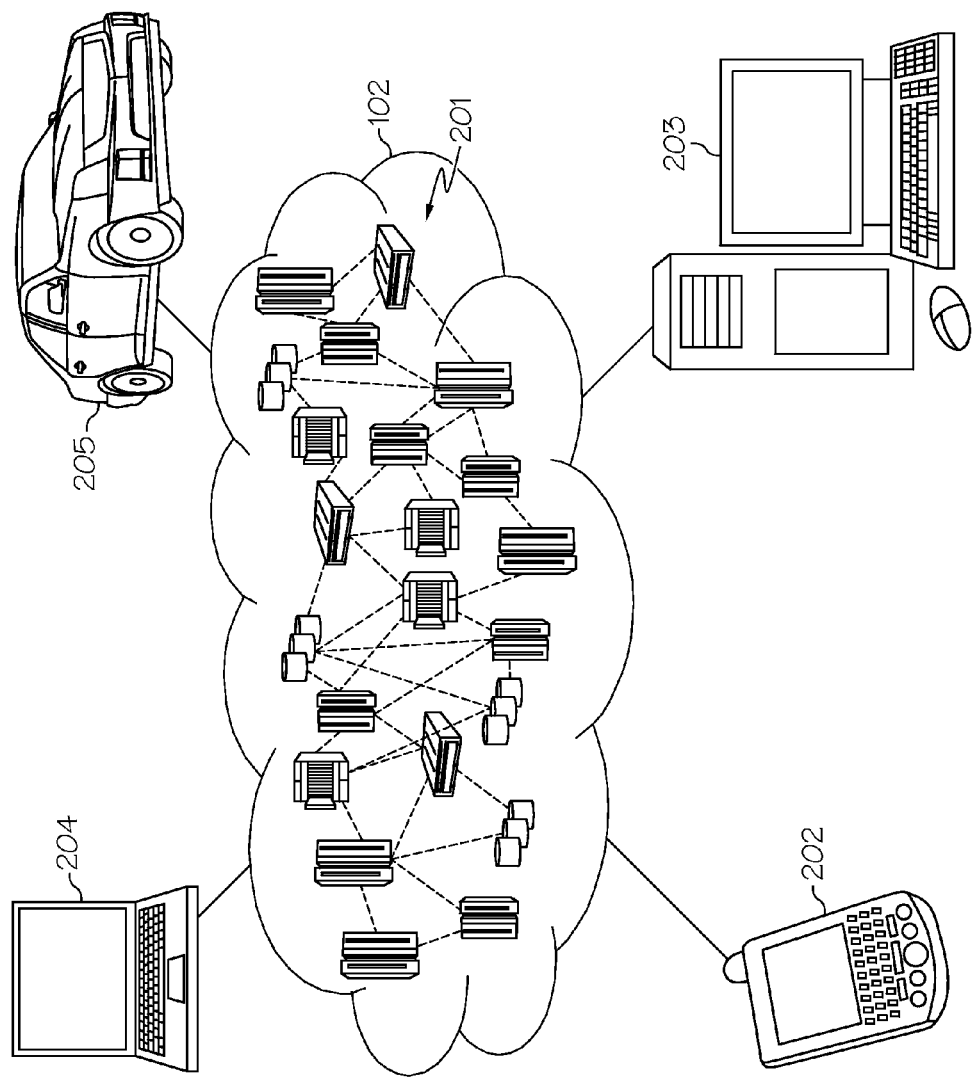
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
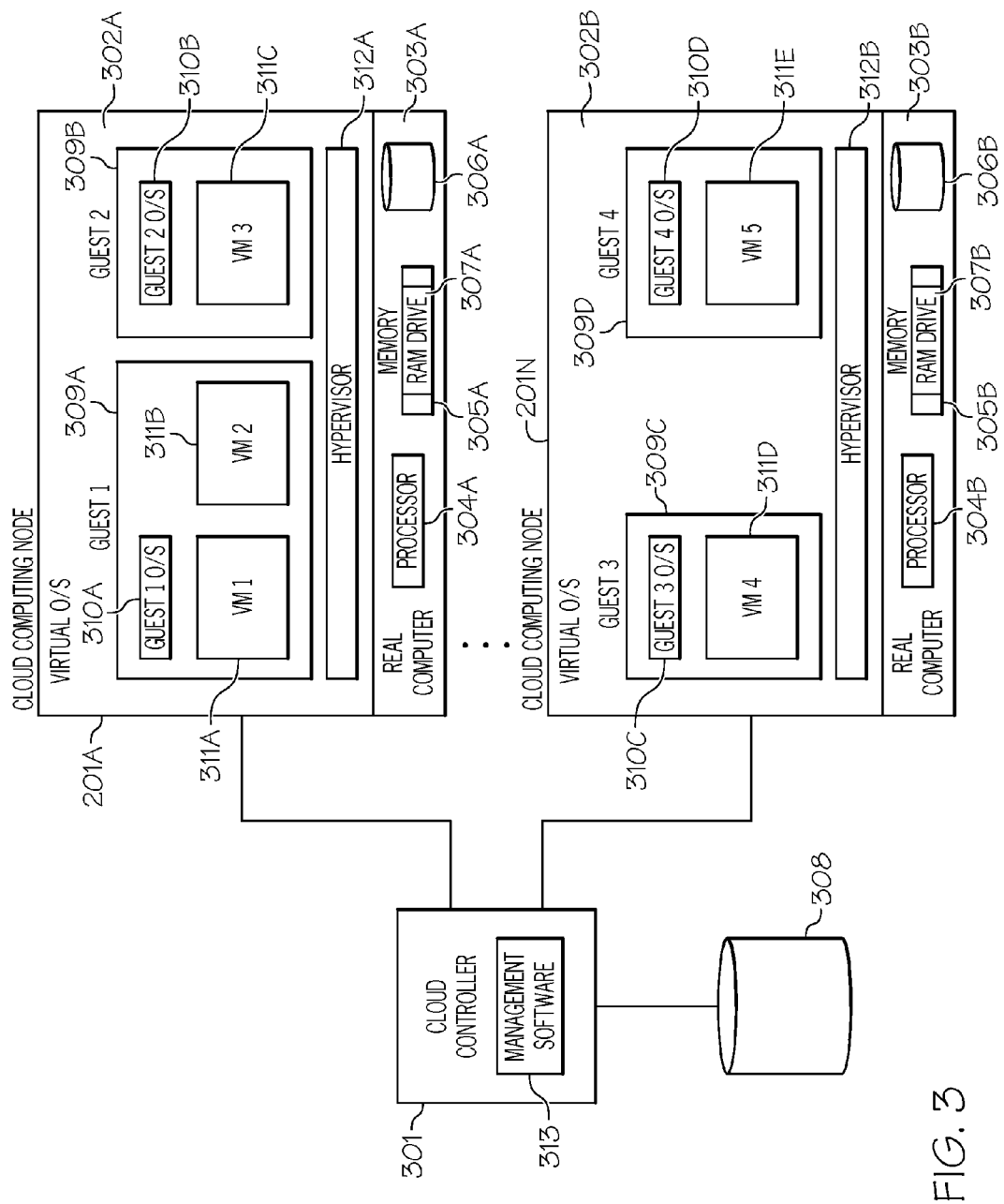
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-201N in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to a cloud controller 301 configured to provide data center-level functions.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. In one embodiment, a writeable partition configured to store middleware and user activity, as discussed further below, is stored in disk drive 306A. In one embodiment, the writeable partition is stored in an external storage unit, such as storage unit 308. In one embodiment, a pool of available virtual machines to be deployed, as discussed further below, resides in memory 305A, disk drive 306A or storage unit 308. In one embodiment, memory 305A is a Random Access Memory (RAM), where a block of RAM 305A corresponds to a RAM drive 307A which is treated as if the memory were a disk drive (secondary storage). In one embodiment, RAM drive 307A stores the virtual machine operating system (guest operating system) and its supporting files as discussed further below. Other components of real computer 303A are not discussed herein for the sake of brevity.

Virtual operating system 302A further includes user portions 309A-309B (identified as "Guest 1" and "Guest 2," respectively, in FIG. 3), referred to herein as "guests." Each guest 309A, 309B is capable of functioning as a separate system. That is, each guest 309A-309B can be independently reset, host a guest operating system 310A-310B, respectively, (identified as "Guest 1 O/S" and "Guest 2 O/S," respectively, in FIG. 3) and operate with different programs. An operating system or application program running in guest 309A, 309B appears to have access to a full and complete system, but in reality, only a portion of it is available.

Each guest operating system 310A, 310B may host one or more virtual machine applications 311A-311C (identified as "VM 1," "VM 2" and "VM 3," respectively, in FIG. 3), such as Java™ virtual machines. For example, guest operating system 310A hosts virtual machine applications 311A-311B. Guest operating system 310B hosts virtual machine application 311C.

Virtual operating system 302A further includes a common base portion 312A, referred to herein as a hypervisor. Hypervisor 312A may be implemented in microcode running on processor 304A or it may be implemented in software as part of virtual operating system 302A. Hypervisor 312A is configured to manage and enable guests 309A, 309B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, RAM drive 307B is functionally the same as RAM drive 307A. Similarly, guests 309C-309D (identified as "Guest 3" and "Guest 4," respectively, in FIG. 3) are functionally the same as guests 309A-309B. Guest operating systems 310C-310D (identified as "Guest 3 O/S" and "Guest 4 O/S," respectively, in FIG. 3) are functionally the same as guest operating systems 310A-310B. Virtual machines 311D-311E (identified as "VM 4" and "VM 5," respectively, in FIG. 3) are functionally the same as virtual machines 311A-311C. Furthermore, hypervisor 312B is functionally the same as hypervisor 312A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

RAM drives 307-307B may collectively or individually be referred to as RAM drives 307 or RAM drive 307, respectively. Guests 309A-309D may collectively or individually be referred to as guests 309 or guest 309, respectively. Guest operating systems 310A-310D may collectively or individually be referred to as guest operating systems 310 or guest operating system 310, respectively. Virtual machines 311A-311E may collectively or individually be referred to as virtual machines 311 or virtual machine 311, respectively. Hypervisors 312A-312B may collectively or individually be referred to as hypervisors 312 or hypervisor 312, respectively.

FIG. 3 is not to be limited in scope to a particular number of cloud computing nodes 201 and each cloud computing node 201 may include any number of guests 309, guest operating systems 310, virtual machines 311, etc. Furthermore, cloud computing nodes 201 include other components that were not discussed herein for the sake of brevity. Hence, cloud computing node 201 is not to be limited in scope to the elements depicted in FIG. 3.

Referring again to FIG. 3, in some embodiments, cloud controller 301 supports a module, referred to herein as the management software 313, that can be used to manage all the hardware components of cloud computing nodes 201, monitor system utilization, intelligently deploy images of data and optimize the operations of cloud computing environment 102. Furthermore, management software 313 can be used to optimize cloud resources in utilizing a pool of virtual machines to service the user's workload by populating the pool of available virtual machines to be deployed with previously terminated virtual machines as discussed further below. A description of the hardware configuration of cloud controller 301 is provided below in connection with FIG. 4.

Figure 4:
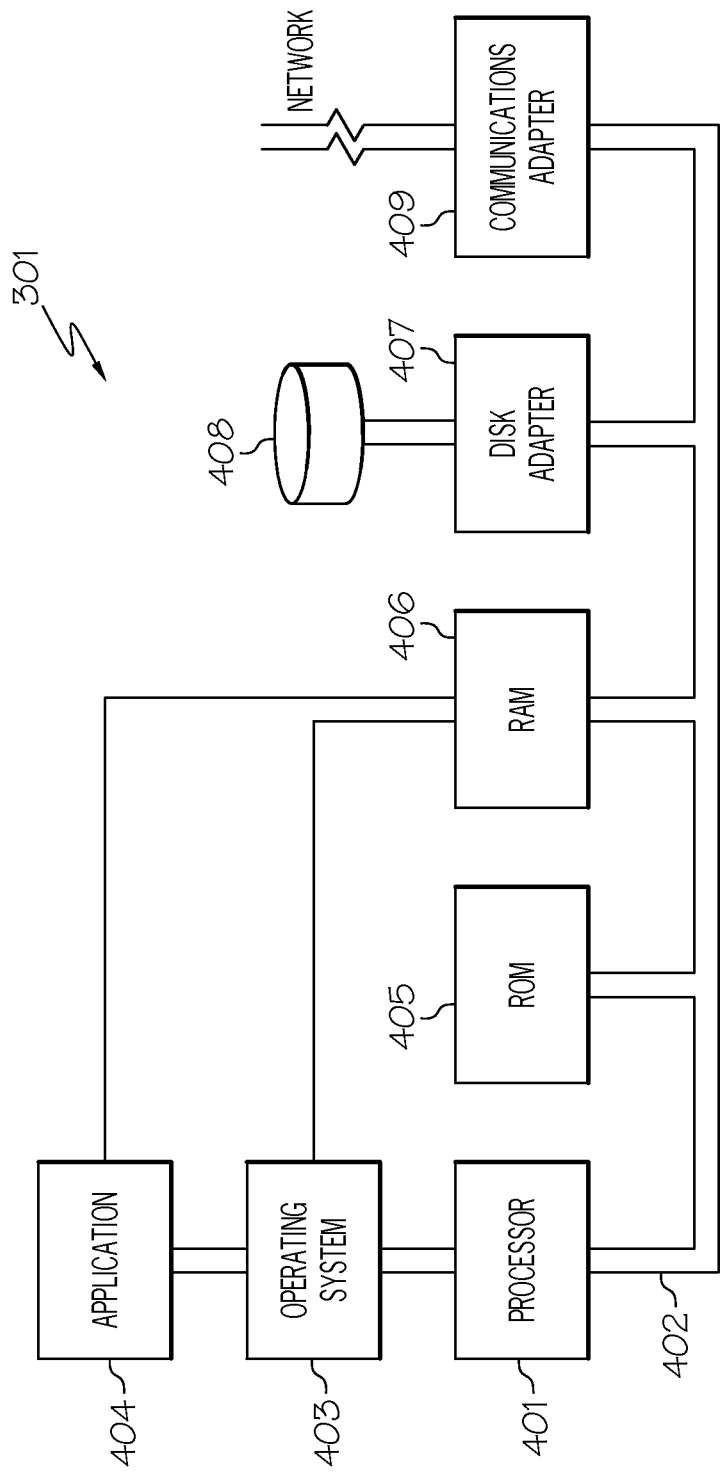
FIG. 4 illustrates a hardware configuration of a cloud controller configured in accordance with an embodiment of the present invention.

Referring now to FIG. 4, FIG. 4 illustrates a hardware configuration of cloud controller 301 (FIG. 4) which is representative of a hardware environment for practicing the present invention. Cloud controller 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program, such as management software 313 of FIG. 3, for optimizing cloud resources in utilizing a pool of virtual machines to service the user's workload by populating the pool of available virtual machines to be deployed with previously terminated virtual machines as discussed further below in association with FIG. 5.

Referring again to FIG. 4, read-only memory ("ROM") 405 is coupled to system bus 402 and includes a basic input/output system ("BIOS") that controls certain basic functions of cloud controller 301. Random access memory ("RAM") 406 and disk adapter 407 are also coupled to system bus 402. It should be noted that software components including operating system 403 and application 404 may be loaded into RAM 406, which may be cloud controller's 301 main memory for execution. Disk adapter 407 may be an integrated drive electronics ("IDE") adapter that communicates with a disk unit 408, e.g., disk drive. It is noted that the program for optimizing cloud resources in utilizing a pool of virtual machines to service the user's workload by populating the pool of available virtual machines to be deployed with previously terminated virtual machines, as discussed further below in association with FIG. 5, may reside in disk unit 408 or in application 404.

Cloud controller 301 may further include a communications adapter 409 coupled to bus 402. Communications adapter 409 interconnects bus 402 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, when a new virtual machine is required to be utilized by the user (i.e., a new virtual machine is required to service the user's workload), various tasks need to be performed utilizing cloud resources. For example, when a new virtual machine is deployed to service the user's workload, a new virtual disk is allocated on a storage device, an operating system is loaded into memory and initialized and various first-boot activities are performed, such as setting a hostname, network address, etc. One method for reducing the burden of virtual machine provisioning at deployment time is to create a pool of pre-deployed virtual machines which may be used when a user requests an instance of a virtual machine. However, the pool of pre-deployed virtual machines is populated with only newly provisioned virtual machines. As discussed above, newly provisioned virtual machines require a significant amount of cloud resources to be utilized. Hence, such a method only shifts the burden of virtual machine provisioning prior to deployment time. If, however, the pool of available virtual machines to be deployed could be populated with previously terminated virtual machines as opposed to only newly provisioned virtual machines, then an overall reduction in the cloud resources being utilized could be achieved. Unfortunately, there is not currently a means for populating the pool of available virtual machines to be deployed with previously terminated virtual machines as opposed to only newly provisioned virtual machines.

The principles of the present invention provide a means for populating the pool of available virtual machines to be deployed with previously terminated virtual machines as opposed to only newly provisioned virtual machines as discussed below in association with FIG. 5.

Figure 5:
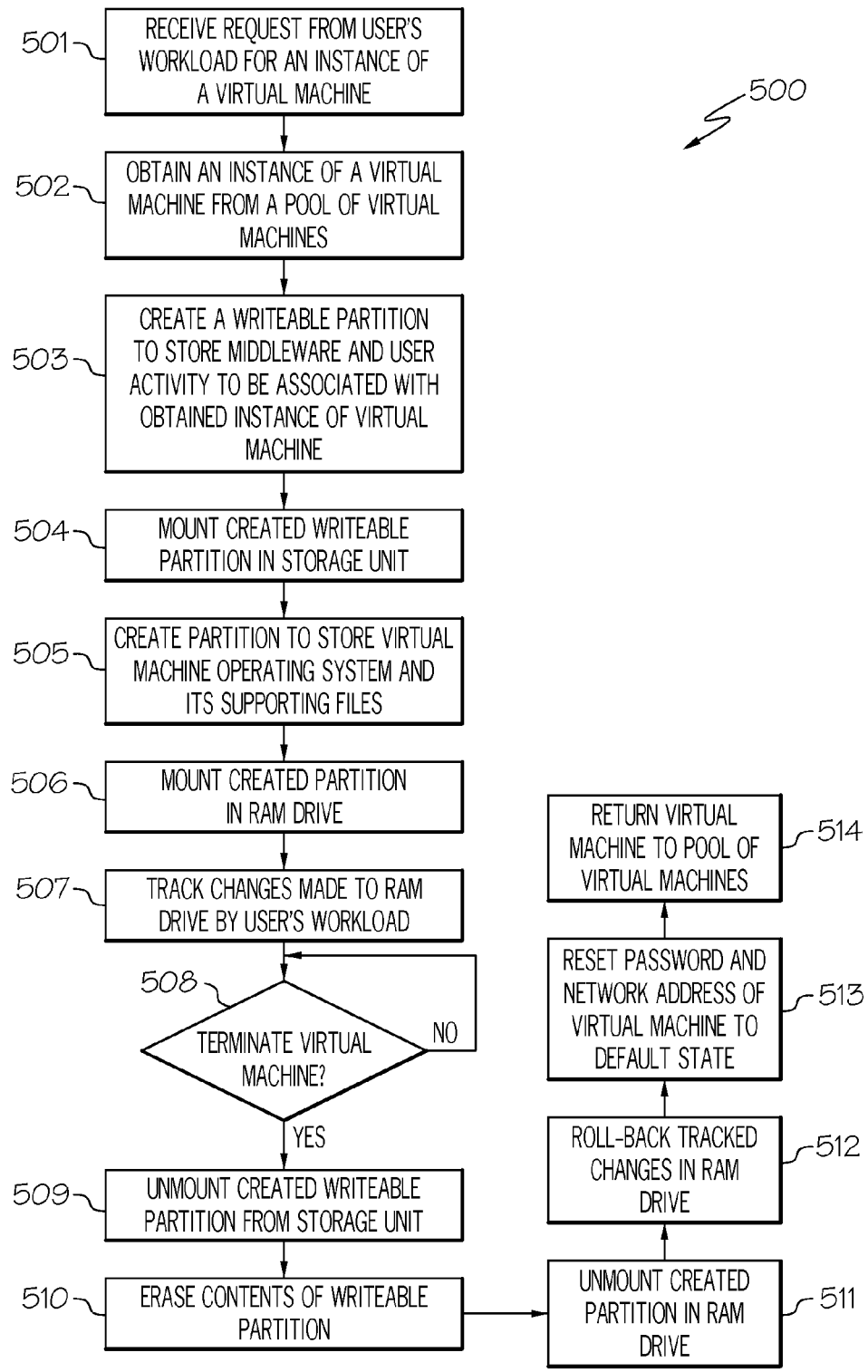
FIG. 5 is a flowchart of a method for optimizing cloud resources in utilizing a pool of virtual machines to service the user's workload by populating the pool of available virtual machines to be deployed with previously terminated virtual machines in accordance with an embodiment of the present invention.

FIG. 5 is a flowchart of a method for optimizing cloud resources in utilizing a pool of virtual machines to service the user's workload by populating the pool of available virtual machines to be deployed with previously terminated virtual machines in accordance with an embodiment of the present invention.

Referring now to FIG. 5, in conjunction with FIGS. 1-4, in step 501, cloud controller 301 receives a request for an instance of a virtual machine from a user's workload to service the user's workload. A "workload" refers to the processing that cloud environment 102 has been given to do by the user (i.e., client device 101).

In step 502, cloud controller 301 obtains an instance of a virtual machine from a pool of available virtual machines to be deployed. In one embodiment, the pool of available virtual machines to be deployed resides in memory 305, disk drive 306 or storage unit 308.

In step 503, cloud controller 301 creates a writeable partition to store middleware and user activity to be associated with the virtual machine obtained in step 502. "Middleware activity" refers to the data generated by the virtual machine obtained in step 502 in connection with the services provided to the virtual machine by the middleware applications. Furthermore, "user activity" refers to the data (e.g., log files, database files) generated by the virtual machine obtained in step 502 in connection with servicing the user's workload. In one embodiment, the writeable partition corresponds to a logical volume.

In step 504, cloud controller 301 mounts the created writeable partition in a storage unit, such as disk drive 306 or storage unit 308. In one embodiment, the data stored in the writeable partition will be erased after its associated virtual machine is terminated thereby allowing the virtual machine to be returned to its pool of available virtual machines to be deployed as discussed below. The data in the writeable partition will be erased so as to prevent the subsequent user from having access to such data. Since the data will be erased, there is no need for cloud controller 301 to track the writeable partition thereby reducing the cloud resources required to be utilized.

Furthermore, the storage unit, such as disk drive 306 or storage unit 308, includes read-only partitions (e.g., read-only logical volumes) configured to store data (e.g., authentication credentials) that needs to be persisted for subsequent users. As a result, cloud controller 301 does not need to track the read-only partitions thereby reducing the cloud resources required to be utilized.

In step 505, cloud controller 301 creates a partition to store the virtual machine operating system (guest operating system) 310 and its supporting files for the virtual machine obtained in step 502. In one embodiment, the partition corresponds to a logical volume.

In step 506, cloud controller 301 mounts the partition created in step 505 in RAM drive 307.

In step 507, cloud controller 301 tracks the changes made to RAM drive 307 by the user's workload. Cloud controller 301 does not track the changes made to the created writeable partition and the read-only partitions in the storage unit (e.g., disk drive 306, storage unit 308). For example, the user's workload may make changes to parts of the guest operating system 310 based on the user's authentication credentials. Since cloud controller 301 only tracks the changes made by the user's workload to RAM drive 307 and does not track the changes made to the created writeable partition and the read-only partitions in the storage unit (e.g., disk drive 306, storage unit 308), the amount of cloud resources dedicated to tracking changes are minimized.

In step 508, a determination is made by cloud controller 301 as to whether the virtual machine (virtual machine obtained in step 502) is terminated.

If the virtual machine obtained in step 502 is not terminated, cloud controller 301 continues to determine whether the virtual machine obtained in step 502 is terminated in step 508.

If, however, the virtual machine obtained in step 502 is terminated, then, in step 509, cloud controller 301 unmounts the created writeable partition from the storage unit (e.g., disk drive 306, storage unit 308).

In step 510, cloud controller 301 erases the contents of the created writeable partition so that the data generated by the middleware and user activity will not be available for subsequent users. Such data may include sensitive data that the user (i.e., client device 101) would not want to be available for subsequent users.

In step 511, cloud controller 301 unmounts the created partition in RAM drive 307.

In step 512, cloud controller 301 rolls back the tracked changes (changes tracked in step 507) in RAM drive 307. These tracked changes are rolled back for security purposes so that no changes to the system (e.g., changes to parts of the guest operating system 310) under the current user are persisted for a subsequent user.

In step 513, cloud controller 301 resets the password and network address of the virtual machine to its default state to prepare the virtual machine to be reused.

In step 514, cloud controller 301 returns the virtual machine to the pool of available virtual machines for deployment. In this manner, the pool of available virtual machines for deployment does not have to be populated only with newly provisioned virtual machines. As a result, fewer cloud resources are used since resource intensive activities, such as allocating a new virtual disk, loading the operating system into memory, initializing the operating system, etc. that were required in provisioning a new virtual machine can be eliminated. Furthermore, the workload deployment time is improved since the cloud resources can be utilized for deploying the user's workload as opposed to being utilized for provisioning new virtual machines.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for optimizing cloud resources in utilizing a pool of virtual machines to service user workloads, the computer program product comprising a computer readable storage medium having program code embodied therewith, the program code comprising the programming instructions for:

receiving a request from a user's workload for an instance of a virtual machine;

obtaining said instance of said virtual machine from a pool of virtual machines;

creating a writeable partition to store middleware and user activity to be associated with said obtained instance of said virtual machine;

mounting said created writable partition in a storage unit;

unmounting said created writable partition from said storage unit in response to said instance of said virtual machine being terminated;

erasing contents of said created writable partition in response to said instance of said virtual machine being terminated; and returning said instance of said virtual machine to said pool of virtual machines in response to said instance of said virtual machine being terminated.

2. The computer program product as recited in claim 1, wherein the program code further comprises the programming instructions for:

creating a partition to store a virtual machine operating system and its supporting files; and mounting said created partition in a Random Access Memory (RAM) drive.

3. The computer program product as recited in claim 2, wherein the program code further comprises the programming instructions for:

tracking changes to said RAM drive made by said user's workload.

4. The computer program product as recited in claim 3, wherein the program code further comprises the programming instructions for:

unmounting said partition in said RAM drive in response to said instance of said virtual machine being terminated; and rolling-back said tracked changes in said RAM drive in response to said instance of said virtual machine being terminated.

5. The computer program product as recited in claim 2, wherein said RAM drive is located in a memory of a cloud computing node.

6. The computer program product as recited in claim 1, wherein the program code further comprises the programming instructions for:

resetting a password and a network address of said instance of said virtual machine to a default state prior to returning said instance of said virtual machine to said pool of virtual machines.

7. The computer program product as recited in claim 1, wherein said writable partition corresponds to a logical volume.

8. A system, comprising:

a memory unit for storing a computer program for optimizing cloud resources in utilizing a pool of virtual machines to service user workloads; and a processor coupled to the memory unit, wherein the processor is configured to execute the program instructions of the computer program comprising:

receiving a request from a user's workload for an instance of a virtual machine;

obtaining said instance of said virtual machine from a pool of virtual machines;

creating a writeable partition to store middleware and user activity to be associated with said obtained instance of said virtual machine;

mounting said created writable partition in a storage unit;

unmounting said created writable partition from said storage unit in response to said instance of said virtual machine being terminated;

erasing contents of said created writable partition in response to said instance of said virtual machine being terminated; and returning said instance of said virtual machine to said pool of virtual machines in response to said instance of said virtual machine being terminated.

9. The system as recited in claim 8, wherein the program instructions of the computer program further comprises:

creating a partition to store a virtual machine operating system and its supporting files; and mounting said created partition in a Random Access Memory (RAM) drive.

10. The system as recited in claim 9, wherein the program instructions of the computer program further comprises:

tracking changes to said RAM drive made by said user's workload.

11. The system as recited in claim 10, wherein the program instructions of the computer program further comprises:

unmounting said partition in said RAM drive in response to said instance of said virtual machine being terminated; and rolling-back said tracked changes in said RAM drive in response to said instance of said virtual machine being terminated.

12. The system as recited in claim 9, wherein said RAM drive is located in a memory of a cloud computing node.

13. The system as recited in claim 8, wherein the program instructions of the computer program further comprises:

resetting a password and a network address of said instance of said virtual machine to a default state prior to returning said instance of said virtual machine to said pool of virtual machines.

14. The system as recited in claim 8, wherein said writable partition corresponds to a logical volume.

\* \* \* \* \*